D. Hammond,

Truss Bridge.

No. 2586. Reissued Apr. 30. 1867.

N. PETERS, PHOTO-LITHOGRAPHER, WASHINGTON, D. C.

United States Patent Office.

DAVID HAMMOND, OF CANTON, OHIO.

*Letters Patent No.* 56,043, *dated July* 3, 1866; *reissue No.* 2,586, *dated April* 30, 1867.

IMPROVEMENT IN BRIDGES.

The Schedule referred to in these Letters Patent and making part of the same.

TO ALL WHOM IT MAY CONCERN:

Be it known that I, DAVID HAMMOND, of Canton, in the county of Stark, and State of Ohio, have invented new and useful improvements in Wrought-Iron Trussed-Girders for Bridges or other structures; and I do hereby declare that the following is a full, clear, and exact description thereof, reference being had to the accompanying drawings, forming a part of this specification, and to the letters of reference marked thereon, of which drawings—

The nature of my invention consists, first, in the novel construction of a wrought-iron arch of double-T iron, arranged with clamping pieces and covering pieces, as hereinafter shown, whereby an arch of great strength and stability is obtained; second, in the novel construction of the clamping pieces which connect the two parts of the arch; and, lastly, in the novel construction of the securing pieces, which secure the covering piece to the arch.

To enable others skilled in the art to make and use my invention, I will proceed to describe its construction and application.

Figure 1:
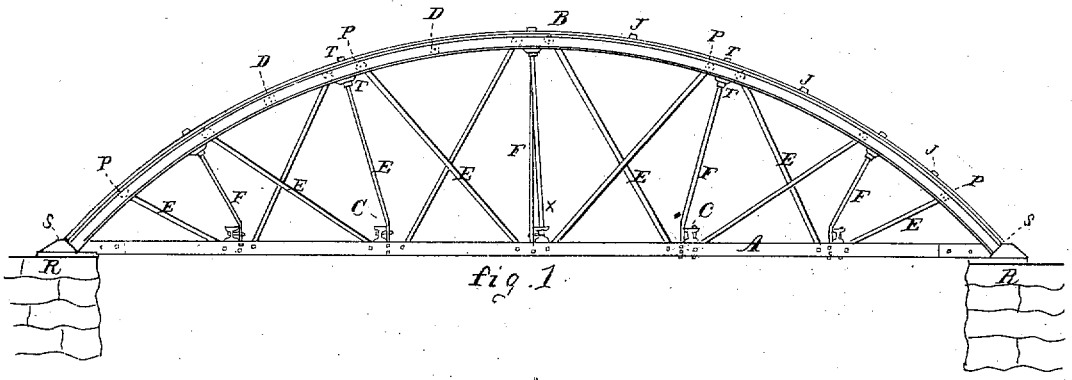
Figure 1 is a side view of girder applied to a bridge.
Figure 2:
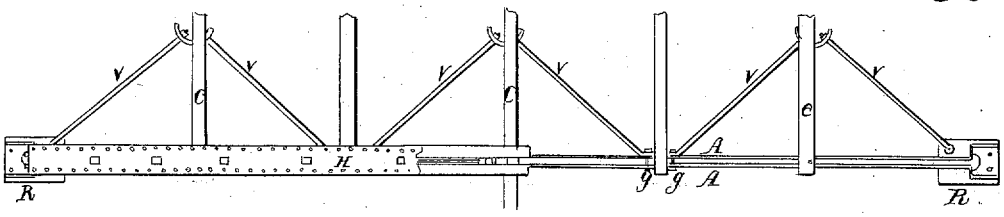
Figure 2 is a half plan of same.
Figure 3:
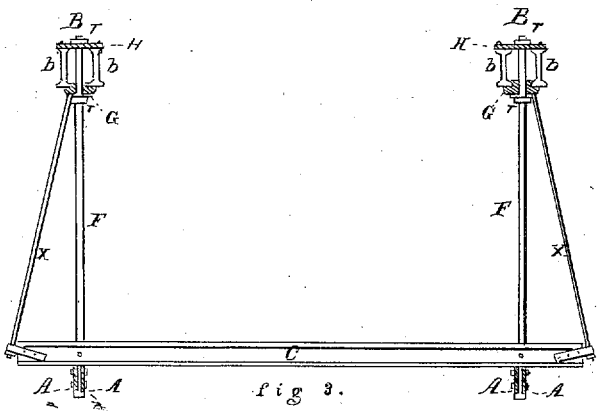
Figure 3 is a cross-section of bridge at the centre.
Figure 4:
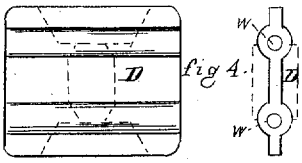
Figure 4 is the details of the double-bolted clamping piece.
Figure 6:
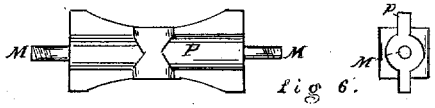
Figure 6 is the details of the single-bolted clamping piece.
Figure 5:
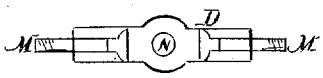
Figure 5 is a top view of double clamping pieces when used in connection with the supporting rods.
Figure 7:
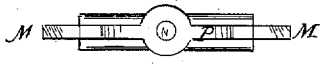
Figure 7 is an elevation of the securing clamp for covering piece.
Figure 7:
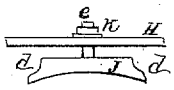

The arch B is made up of two arches of double-T iron placed parallel to each other, each arch of which is composed of pieces of double-T iron, curved to the proper curvature, and with their adjacent ends butting squarely against each other. The clamping pieces D and P are inserted between these two arches, and have the bolts M, which pass through the web of the double-T iron, and are secured by nuts on the outside, thus firmly connecting the two parts of the arch. These clamping pieces are of a novel construction, being either single or double-bolted. The double-bolted clamping piece, shown in fig. 4 in detail, is made with the holes W W when used simply as a clamping piece, the bolts M passing through the holes W; but when this piece is also used as an aid in securing the supporting-rods, it is made as indicated by dotted lines in fig. 4, and top view of which is shown in fig. 5, the supporting-rod passing through the hole N, and being secured by a nut on the top, the bolts M being made with the clamping piece. The single-bolted clamping pieces P, shown in detail in fig. 6, have the hole N, through which pass the braces E; these clamping pieces, by the peculiar construction, allowing of rotation, so as to adapt them to any position of the braces E, for which they are more particularly adapted. The ends of the arch are connected by the chords A A and bolts S S, which bolts pass through the ends of the arch, the ends of the chords and cast-iron blocks, which are put in to fill up the space in and between the double-T irons, and to keep the two ends of the chord apart, thus firmly securing the ends of the arch and the chords to each other. The suspension-rods F pass through the head of the braces X, and through the iron G, and through the top or covering piece H, being secured by the nuts T T, or a double clamping piece, of the construction shown in figs. 4 and 5, may be used, the first mode being the one I prefer. The suspension-rods F pass between the chords A A, and are cut in so as to form a place to receive the chords, which chords are secured to rods F by bolts, as shown. The string pieces C are laid on the chords A, and either bolted to the suspension-rods F or secured by bolts passing through the flanges of the string piece, and down between the chords A A, being secured by a washer and nut below, as shown, the former being preferable where flat iron is used for the suspension-rods F, and the latter where round iron is used. The lower ends of the braces E are secured to the bolts *g* in the chords A, their upper ends being secured to the clamping pieces P. These bolts *g* also secure the ends of the horizontal braces V, which prevent any horizontal vibration of the bridge. The braces X are secured to the suspension-rods F, as shown, and to the end of the chord C by the iron *i*, which is riveted to the chord, and which has an eye at its end, through which passes the brace X, which is secured by a nut, as shown. The covering piece H is secured to the arch by means of the securing pieces J, and also by riveting, as shown in figs. 2 and 3, one or both modes of fastening being used as desired. These securing pieces J, shown in fig. 7, have the sides *d d* made to fit the flanges of the double-T iron forming the arch, and have the bolt *e*, which passes through the covering piece H, and is secured by the nut K on the top. In this manner I construct a girder of great strength and stability, which is well protected from rain and moisture, and has little or no lateral vibration, with a small amount of iron.

I do not claim as my invention the use of the shoes R, the chords A A, the suspension-rods F, the string pieces C C, the braces E, V, and X, nor the iron G, as these have been before used and patented; but what I do claim as my invention, and desire to secure by Letters Patent, is—

1. The arch B, composed of the two double-T irons *b b*, combined and arranged with clamping and securing pieces, and covering pieces, in the manner and for the purpose herein specified.
2. The clamping piece D, constructed and arranged as hereinbefore specified.
3. The clamping piece P, constructed and arranged as hereinbefore specified.
4. The securing piece J, constructed and arranged as hereinbefore specified.

Witnesses:

E. N. Beebout,

D. J. Myers.

DAVID HAMMOND.